United States Patent [19]

Cohen

[11] Patent Number: 4,840,058

[45] Date of Patent: Jun. 20, 1989

[54] METHOD OF LEAK TESTING A CAVITY

[75] Inventor: Elie Cohen, Paris, France

[73] Assignee: Societe De Traitement Automatique - Control et Etancheite, Fresnes, France

[21] Appl. No.: 176,548

[22] Filed: Apr. 1, 1988

[30] Foreign Application Priority Data

Apr. 2, 1987 [FR] France ............... 87 04608

[51] Int. Cl.$^4$ ........................... G01M 3/26
[52] U.S. Cl. .................................. 73/40
[58] Field of Search ................. 73/40, 49.2

[56] References Cited

U.S. PATENT DOCUMENTS

| 3,331,237 | 7/1967 | Strang | 73/40 |
| 3,359,785 | 12/1967 | Fournier | 73/40 |
| 3,465,562 | 9/1969 | Donohoe | 73/40 |
| 4,135,386 | 1/1979 | Peterson et al. | 73/40 |

Primary Examiner—Michael J. Tokar
Assistant Examiner—Joseph W. Roskos
Attorney, Agent, or Firm—Sughrue, Mion, Zinn, Macpeak & Seas

[57] ABSTRACT

A method of leak testing at least one "main" cavity (1) formed in a body (2), involving filling the main cavity with a test gas (6) at a determined pressure (PO). The leakage pressure variation (15, 16) in the main cavity is measured while reducing the pressure inside the main cavity in steps ($dp_n$) by means of a controllable valve (12). The various values of leakage pressure variation, are compared with equal values being representative of a part that is leaky and with values that become smaller from one measurement to another being representative of the presence of at least one secondary cavity communicating with the main cavity via a seepage path (4) having high head loss. The two cavities taken together are possibly non-leaky.

5 Claims, 1 Drawing Sheet

METHOD OF LEAK TESTING A CAVITY

The present invention relates to methods of leak testing a cavity hollowed out in a body, and more particularly to methods capable of discriminating between leaky cavities and cavities which are in communication with secondary, "parasitic" cavities via seepage paths having very high head loss, but which are not leaky, said secondary cavities constituting that which is referred to as "porosity" by the person skilled in the art.

BACKGROUND OF THE INVENTION

In various industries there are numerous parts having internal cavities which must not leak if they are to perform the function required of them, where the exact definition of not "leaking" depends on the practice in any given field.

There already exist numerous methods of leak testing a cavity, i.e. methods which serve to determine whether a cavity is in communication or not in communication with the surrounding medium via leakage paths or the like. The present Applicant has already developed a method of performing such tests and filed a (French) patent applicaiton on Sept. 10, 1984 under the No. 84 13827. This method gives very good results when the part under test is indeed leaky or not leaky.

However, some parts may be determined as being leaky when, in fact, they are not leaky. This applies to parts which include secondary, "parasitic" cavities close to their normal main cavities and connected thereto via seepage paths having very high head loss. In prior leak testing methods, and in particular in the method mentioned above, the main cavity is tested for leaks by injecting a fluid under pressure into the cavity, and then by observing pressure variation, in particular inside the cavity, it is possible to determine whether the cavity is leaky or not. However, if the cavity is connected to a secondary cavity via a seepage path having very high head loss, the quantity of fluid which may flow from the main cavity to the secondary cavity may be interpreted, when performing measurements in accordance with prior methods, as constituting a leak, even though said main cavity taken in conjunction with the secondary cavity is not leaky.

Naturally, this lack of precision can be resolved merely by waiting long enough for the test gas pressure in the cavities to come to equilibrium. Once equilibrium has been reached, the part can be leak-tested by performing measurements in accordance with a prior method.

This procedure naturally gives the desired result. However, it undeniably suffers from the drawback of considerably lengthening the time required for testing, and thus increasing the overall cost of parts tested in this way.

The object of the present invention is to mitigate the above-mentioned drawbacks, by implementing a method capable of discriminating between a leaky part and a non-leaky part having the above-mentioned characteristics, and further, capable of achieving this result in a relatively short period of time while retaining the advantages of prior leak testing methods which, in general, give very good results, very quickly.

SUMMARY OF THE INVENTION

More precisely, the present invention provides a method of leak testing at least one "main" cavity formed in a body, the method consisting in filling said main cavity with a test gas at a determined pressure, in measuring the leakage pressure variation in said main cavity while reducing the pressure inside said main cavity in steps by means of a switchable controllable value, and in comparing the various values of leakage pressure variation, with equal values being representative of a part that may be leaky, and with values that become smaller from one measurement to another being representative of the presence of at least one secondary cavity communicating with said main cavity via a seepage path having high head loss, said two cavities taken together being possibly non-leaky.

BRIEF DESCRIPTION OF THE DRAWING

An implementation of the invention is described by way of example with reference to the accompanying drawing, in which.

MORE DETAILED DESCRIPTION

Figure 1:
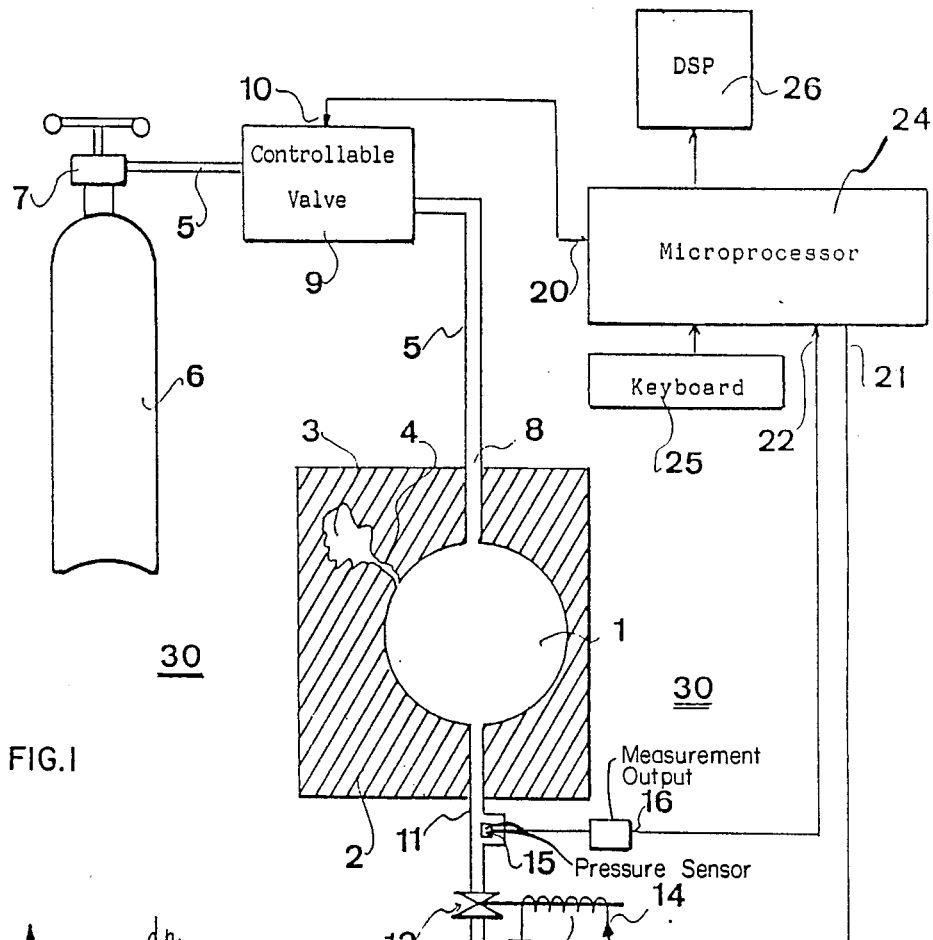
FIG. 1 is a diagram of means for implementing the method.

Returning more particularly to FIG. 1, asume by way of example that it is necessary to test a cavity 1 in a part 2 (e.g. a cylinder in an engine block or the like) for leaks without ignoring the possibility that the cavity 1 may be in communication with a secondary, parasitic cavity 3 which is small in volume compared with the "main" cavity 1. Such a secondary cavity may be constituted, for example, by inclusions, e.g. bubbles of imprisoned air, which occur when a part is cast, said inclusions constituting porosity. It is assumed, in this case, that the secondary cavity 3 is connected to the main cavity 1 by a seepage path 4 having very high head loss.

In order to implement the method, the main cavity 1 is connected by a duct 5 to a supply of test gas 6, e.g. a cylinder of compressed air, whose outlet includes controllable expander 7 connected to the inlet 8 of the main cavity 1 via controllable closure means 9. Said means 9 may be constituted, for example, by an electromagnetic valve excitable via an input 10. The main cavity 1 is connected to the outside via a second duct 11 which may have a portion in common with the duct 5, but which is shown as being completely separate therefrom in order to simplify the drawing. The duct 5 is closed by an electrically controllable valve 12, under the control of an electromagnetic relay 13, for example, which is in turn suitable for receiving an electrical signal on an input 14.

A pressure sensor 15 is disposed in an atmosphere representative of the atmosphere contained in the main cavity 1, for example at the outlet from the main cavity in the duct 11, and its measurement output 16 may be connected to any apparatus suitable for processing electronic signals.

In order to facilitate implementing the method, the inputs 10 and 14, and the output 16 are respectively connected to outputs 20 and 21 and to an input 22 of a microcomputer type processor apparatus 24 including a microprocessor, control means 25, and optionally a display 26 such as a monitor screen, or the like.

Figure 2:
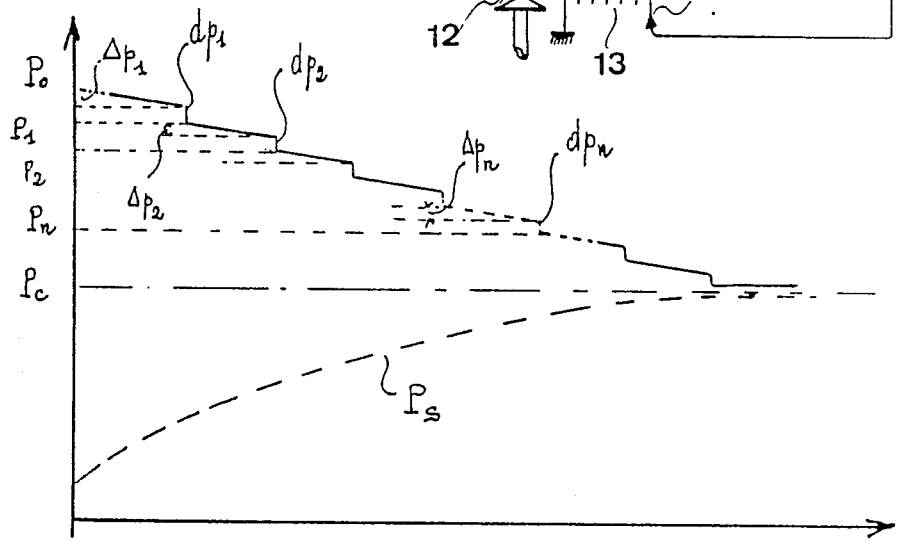
FIG. 2 is a curve for explaining how to implement the method using the means of FIG. 1.

The method is implemented as follows:

In a first step, electrically controllable valve 12 is closed and controllable valve 9 is opened so as to inject a certain quantity of test gas into the main cavity 1, until a given pressure is obtained in this cavity, with the value of said given pressure being represented in FIG. 2 as the value at the origin Po, e.g. 1,020 millibars. For simplification purposes, the rise in pressure within the main cavity 1 is not shown by the curve of FIG. 2.

Leakage pressure variation $\Delta p_1$ is measured a first time using a known method. After a test period of a few seconds, e.g. four seconds, the pressure inside the main cavity 1 is reduced by a very small quantity, e.g. by a first value $dp_1$, as shown in FIG. 2, in order to reduce the pressure from the value Po to P1. A second leakage pressure variation $\Delta P_2$ is then measured.

Further pressure drops $dp_2, dp_3, \ldots, dp_n$ are then established inside the main cavity dropping its pressure successively to P2, P3, ..., Pn, and each time the leakage pressure variation $\Delta p_3, \Delta p_4, \ldots, \Delta p_n$ is measured. The number n depends on the result of a comparison between the leakage pressure variation measurements and a threshold value $\Delta p$, beyond which the part is declared to be leaky, and also on comparisons between the measurements themselves.

If $\Delta p_1 \approx \Delta p_2 > \Delta p$, then the cavity 1 regularly loses the same quantity of test gas between two successive imposed pressure reductions, and this quantity is greater than a predetermined leakage threshold. The part is declared leaky and the test may be stopped at n=2 or n=3.

Naturally, if $\Delta p_1 \approx \Delta p_2 < \Delta p$, then the cavity is declared non-leaky and the test can also be stopped at n=2 or n=3.

However, if $\Delta p_1 > \Delta p_2 > \Delta p$, it may be deduced that the cavity 1 is in communication with at least one secondary, "parasitic" cavity 3 via a seepage path 4 having high head loss, but it is not possible to come to a conclusion about overall leakage. The fact that $\Delta p_2$ is less than $\Delta p_1$ implies that the test gas is flowing out from the cavity 1 at a reduced rate. This slowdown cannot be due to a leak since that would be contrary to the definition of a leak. It can only be explained by the presence of at least one secondary, "parasitic" cavity whose volume is small compared to the volume of the main cavity 1 and which is in communication therewith via a seepage path 4 having high head loss. In this case, the test gas inserted into the main cavity flows into the secondary cavity (increase in Ps in FIG. 2), and this effect may be superposed on a leak, with the flow rate slowing down as the pressures inside the two cavities move closer to equilibrium Pc.

In order for the test to show up the presence or absence of a leak, it must be possible to perform measurements of $\Delta p_n$ when the pressure in the main cavity is relatively close to equilibrium Pc. Further pressure steps must therefore be produced in the cavity 1, with these steps making it possible to approach the equilibrium state more quickly, and thus making it possible to test leakage per se more quickly.

For example, a series of comparisons such as:

$$\Delta p_1 > \Delta p_2 > \Delta p_3 > \Delta p_4 > \Delta p > \Delta p_5 \approx \Delta p_6$$

indicates that the part under test is not leaky even though the initial leakage pressure measurements could have caused it to be rejected since they appear to show that it is leaky.

It can thus be seen that the above-described method is indeed capable of discriminating between a leaky body and a non-leaky body having the above-mentioned characteristics.

Naturally, two cavities which are interconnected by a path that does not have high head loss do not give rise to a problem since these two cavities appear to be a single cavity to the test method.

In an advantageous implementation of the method, the initial pressure is slightly greater than one thousand millibars, and the amplitudes of the imposed pressure drops are a few thousandths of the initial test pressure value, with these imposed pressure drops taking place about every four seconds. In general, seven steps are enough to be able to decie on the quality of the part under test.

In practice, the amplitude of the imposed pressure drop is not necessarily constant. The pressure drops must tend fairly quickly to the equilibrium state Pc, without going past it, with the later test measurements being those which make it possible to determine whether the part is leaky or not. In particular, when the values of leakage pressure variation fall off very quickly, that means that the flow of test gas into the secondary cavity 3 is slowing down very quickly, that the equilbrium state Pc is very close, and that the next imposed pressure drop may go past it, thereby causing the secondary cavity 3 to start emptying out into the cavity 1. It would then be impossible to detect a possible leak by means of the sensor 15.

In this case where the reduction between two successive leakage pressure variation values is very rapid, the amplitude of the imposed drop $dp_n$ is made smaller. For example, if $\Delta p_1 >> \Delta p_2 > \Delta p$, but $\Delta p_2 < 1.5 \Delta p$, then, $dp_2$ may be selected to be approximately $\frac{1}{2} dp_1$, for example.

The advantage of such a method can be seen: while still using conventional leak test methods, it makes it possible to observe that some parts are not leaky but merely suffer from porosity which would make them appear to be leaky when tested using conventional methods. The method in accordance with the invention increases the test time normally required for such measurements very little since the method in accordance with the invention starts being implemented as soon as the rise in test gas pressure has been completed, and there is no need to wait for pressure equilibrium to be reached between the pressures in the cavities that are in communication. The method of the invention therefore makes it possible to retain parts which would otherwise have been rejected for lack of testing time, even though they were potentially non-leaky, thus increasing manufacturing yield.

I claim:

1. A method of leak testing at least one "main" cavity formed in a body, the method consisting in filling said main cavity with a test gas at a determined pressure, in measuring the leakage pressure variation in said main cavity while reducing the pressure inside said main cavity in steps ($dp_n$) by means of a controllable valve, and in comparing the various values of leakage pressure variation, with equal values being representative of a part that may be leaky, and with values that become smaller from one measurement to another being representative of the presence of at least one secondary cavity communicating with said main cavity via a seepage path having high head loss, said two cavities taken together being possibly non-leaky.

2. A method according to claim 1, wherein the amplitudes ($dp_n$) of the step reductions of the determined pressure are a function of the values of leakage pressure variation.

3. A method according to claim 1, wherein the amplitudes ($dp_n$) of the step reductions of the determined pressure are equal to a few thousandths of the value of said determined pressure.

4. A method according to claim 1, wherein said pressure reductions take place about once every four seconds.

5. A method according to claim 1, wherein the number of pressure reductions is substantially equal to seven.

* * * * *